(12) United States Patent
Frazee

(10) Patent No.: US 9,144,243 B2
(45) Date of Patent: Sep. 29, 2015

(54) METHOD AND SYSTEM FOR MAKING A SNACK PRODUCT USING A DOUGH AGGLOMERATE

(75) Inventor: Bradley C. Frazee, Idaho Falls, ID (US)

(73) Assignee: MILES WILLARD TECHNOLOGIES, LLP, Idaho Falls, ID (US)

( * ) Notice: Subject to any disclaimer, the term of this patent is extended or adjusted under 35 U.S.C. 154(b) by 1466 days.

(21) Appl. No.: 12/044,226

(22) Filed: Mar. 7, 2008

(65) Prior Publication Data

US 2009/0226591 A1 Sep. 10, 2009

(51) Int. Cl.
| | |
|---|---|
| A21D 8/02 | (2006.01) |
| A47J 43/00 | (2006.01) |
| A47J 43/04 | (2006.01) |
| A21D 2/36 | (2006.01) |
| A23L 1/00 | (2006.01) |

(52) U.S. Cl.
CPC ............... *A21D 2/366* (2013.01); *A23L 1/0073* (2013.01)

(58) Field of Classification Search
USPC .......................... 426/438, 439, 549, 560, 808
See application file for complete search history.

(56) References Cited

U.S. PATENT DOCUMENTS

| | | | |
|---|---|---|---|
| 2,155,454 A * | 4/1939 | Temple .......................... 220/213 |
| 4,528,202 A * | 7/1985 | Wang et al. .................... 426/550 |
| 4,623,550 A | 11/1986 | Willard |
| 4,769,253 A | 9/1988 | Willard |
| 4,770,891 A | 9/1988 | Willard |
| 4,861,609 A | 8/1989 | Willard et al. |
| 4,876,101 A | 10/1989 | Willard |
| 4,879,126 A | 11/1989 | Willard et al. |
| 4,889,733 A | 12/1989 | Willard et al. |
| 4,931,303 A | 6/1990 | Holm et al. |
| 4,970,084 A * | 11/1990 | Pirrotta et al. ................. 426/289 |
| 4,973,481 A | 11/1990 | Hunt et al. |
| 4,976,978 A * | 12/1990 | Schubert ........................ 426/295 |
| 4,994,295 A | 2/1991 | Holm et al. |
| 5,192,574 A | 3/1993 | Hunt et al. |
| 5,366,749 A | 11/1994 | Frazee et al. |
| 6,001,409 A * | 12/1999 | Gimmler et al. ............... 426/549 |
| 6,432,465 B1 | 8/2002 | Martines-Serna Villagran et al. |
| 6,558,730 B1 | 5/2003 | Gisaw et al. |
| 6,572,910 B2 | 6/2003 | Lanner et al. |
| D490,590 S | 6/2004 | Ferguson et al. |
| 6,777,020 B2 | 8/2004 | Villagran et al. |
| 6,808,734 B2 | 10/2004 | Villagran |
| 6,830,767 B2 | 12/2004 | Teras et al. |
| 7,332,189 B2 * | 2/2008 | Mihalos et al. ................ 426/497 |
| 2004/0185149 A1 * | 9/2004 | Prosise et al. .................... 426/72 |

OTHER PUBLICATIONS

NPL Bulk density and specific gravity' chart : http://asiinstruments.com; 1998 (waybackmachine.com).*
NPL "aggromerate and powder" by Nichols G et al., "A review of the terms agglomerate and aggregate with a recommendation for nomenclature used in powder and particle characterization" J pharmaceutical Sci. 91(10): p. 2103-2109,2002.*

* cited by examiner

*Primary Examiner* — Michele L Jacobson
*Assistant Examiner* — Bhaskar Mukhopadhyay
(74) *Attorney, Agent, or Firm* — Stephen A. Gratton

(57) ABSTRACT

A method for making a snack product includes the step of mixing ingredients for the dough with water in a low shear environment using a low shear mixing apparatus to form a dough agglomerate. The ingredients can include a major ingredient, such as potato flakes, corn or grain, and minor ingredients including emulsifier, sugar, salt, leavening and a modified starch having a high affinity for water. During the mixing step the dough agglomerate forms with wetted areas of the major ingredient which are surrounded by wetted high water affinity starch and minor ingredients. The method also includes the step of chopping the dough agglomerate into clumps of a desired size, sheeting the dough agglomerate into a dough sheet, forming the dough sheet into snack pieces, and then cooking the snack pieces.

20 Claims, 3 Drawing Sheets

METHOD AND SYSTEM FOR MAKING A SNACK PRODUCT USING A DOUGH AGGLOMERATE

BACKGROUND

Snack food manufacturers are constantly developing fabricated snack products which satisfy the demands of consumers, and which can be manufactured consistently with low costs. Most fabricated snack products are made from dough compositions containing starch based materials. For example, dried potato, or grain flour (e.g., corn, wheat, oats, rice) is often used in combination with raw starch, pregelatinized starch, oil, emulsifier, and flavorings to form a dough.

The composition and mixing of the dough affects both the organoleptic properties of snack products, and also the physical characteristics of snack products. One physical characteristic that is undesirable in snack products is excessive bubbling and expansion. This characteristic makes a snack product prone to breakage prior to consumption, and produces an uneven crispness, crunchiness and mouthfeel during consumption. One factor that contributes to excessive bubbling and expansion is the breakdown and release of starch during mixing of the dough. During mixing, the dough absorbs mechanical energy, and this energy can break down starches, and other ingredients as well.

The present disclosure is directed to a method and a system for making a snack product in which a dough agglomerate is formulated to include a mixture of intact flakes of ingredients that have not been altered by shear forces, air, and water. The dough agglomerate can be used to make an expanded snack product with a controlled density and texture, but without excessive expansion and bubbling.

SUMMARY

A method for making a snack product includes the step of mixing ingredients and water in a low shear force environment to form a dough agglomerate. The ingredients can include a major ingredient, such as dried potato or grain flour, and minor ingredients including emulsifier, sugar, salt, leavening and a modified starch having a high affinity for water. During the mixing step, the high water affinity starch combines with water, becomes sticky, and attaches to the other ingredients, forming a dough agglomerate comprised of areas of wetted flakes of the major ingredient surrounded by wetted starch and other minor ingredients. The method can also include the steps of chopping the dough agglomerate into clumps of a desired size, sheeting the dough agglomerate into a dough sheet comprised of compressed agglomerates, forming the dough sheet into snack pieces, and then cooking the snack pieces.

A system for producing the snack product includes the major ingredient, the minor ingredients and a low shear force mixing apparatus configured to form the dough agglomerate with a low shear force. The low shear force mixing apparatus can include a rotating drum configured to tumble the ingredients along an inside diameter thereof, a scraper bar configured to scrape the ingredients from the inside diameter and to contain a bulk of the ingredients in a selected area, and a nozzle configured to spray water on the ingredients. The system can also include a chopper configured to chop the dough agglomerate into clumps of a desired size, and a sheeting apparatus configured to sheet the dough agglomerate into a dough sheet comprised of compressed agglomerates. The system can also include a forming apparatus, such as a cutter, configured to cut the dough sheet into individual snack pieces, and a cooking apparatus, such as an oven or a fryer, configured to cook the snack pieces into the snack product.

A snack product includes the major ingredient and the minor ingredients in a matrix of compressed agglomerates. In addition, the compressed agglomerates have not been overworked or subjected to large shear forces, which allows for controlled bubbling and expansion of the snack product through intact flakes of the major ingredient.

DETAILED DESCRIPTION

Figure 1:
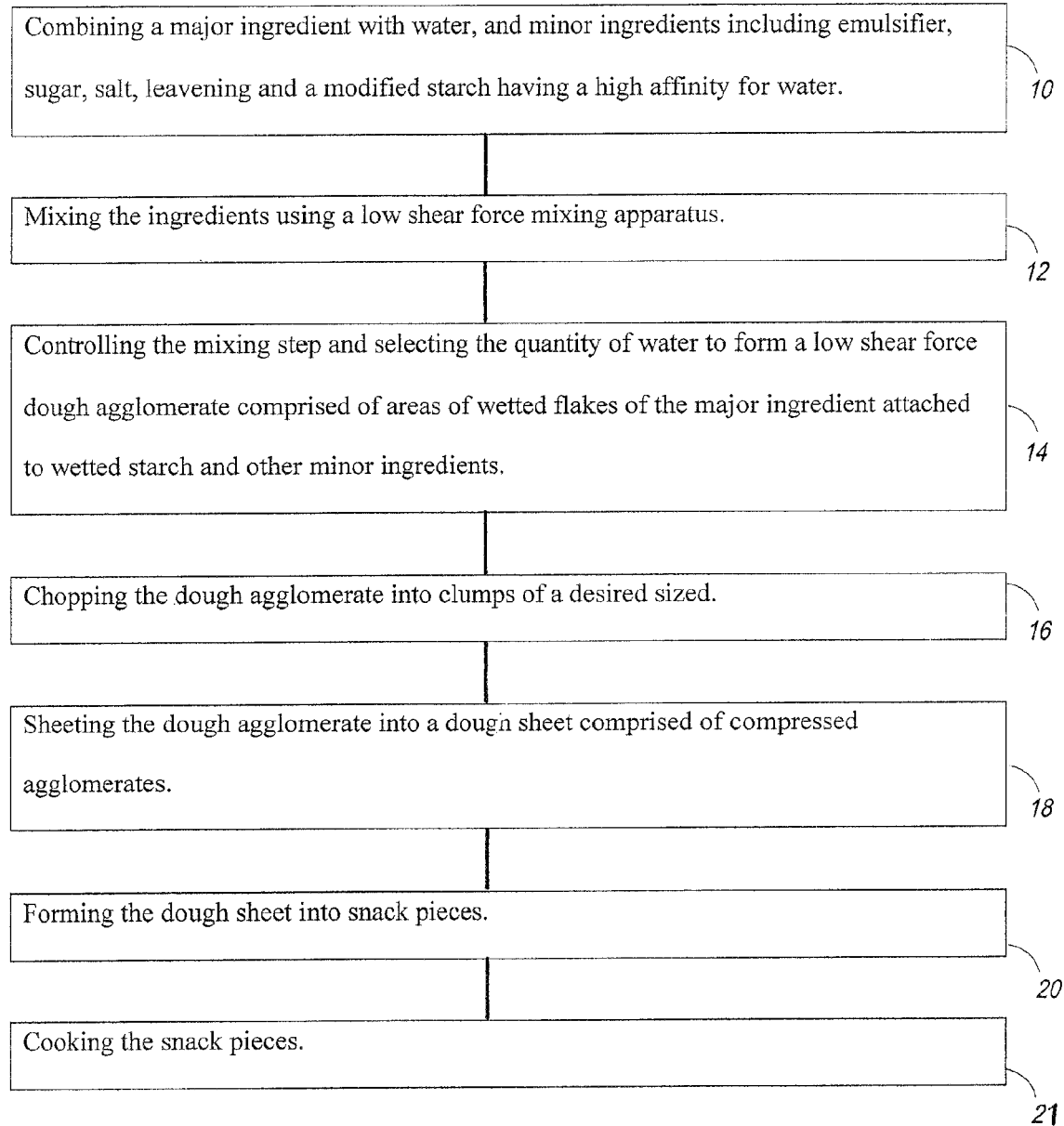
FIG. 1 is a block diagram showing steps in a method for making a snack product.
Figure 2A:
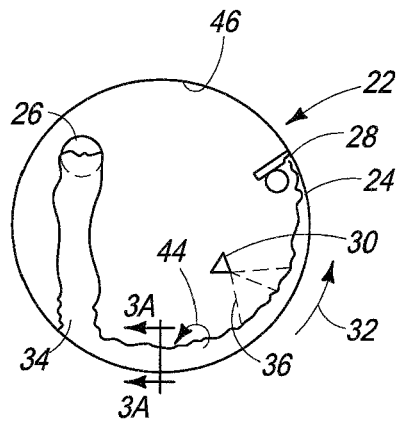
FIG. 2A is a schematic cross sectional view of a low shear force mixing apparatus at the beginning of a mixing step.

Referring to FIG. 1, steps in a method for making a snack product are shown in a block diagram. In the illustrative embodiment the method is performed using a major ingredient in the form of potato flakes. However, it is to be understood that the method can be performed using another major ingredient, such as flakes or flecks of grain made of corn, wheat, oat, or rice. As shown in block 10, the method includes the step of combining a major ingredient with water, and minor ingredients including emulsifier, sugar, salt, leavening and a modified starch having a high affinity for water. In the illustrative embodiment the modified starch comprises "STABITEX" manufactured by Cargill, Inc. of Cedar Rapids, Iowa.

As shown in block 12 of FIG. 1, the method also includes the step of mixing the ingredients with water in a low shear force environment using a low shear force mixing apparatus. As used herein, the term "shear force" means a force which tends to cause sliding and energy input into adjacent layers of dough relative to one another. A "low shear force mixing apparatus" is one that mixes the dough ingredients with minimal sliding of the adjacent layers of dough and minimal energy input. Exemplary low shear force mixing apparatus include mixers having a rotating drum which tumbles the dough ingredients. Exemplary "high shear force mixing apparatus" include mixers that employ a stationary bowl and a rotating dough hook or paddle to mix the dough ingredients. High shear force mixing apparatus are not suitable for practicing the method of the invention.

As shown in block 14 of FIG. 1, the method also includes the step of controlling the mixing step and selecting the quantity of water to form a low shear force dough agglomerate comprised of areas of wetted flakes of the major ingredient attached to wetted starch and other minor ingredients. As used herein, the term "dough agglomerate" refers to a snack product dough which has a non homogeneous composition in which areas of wetted flakes are surrounded by wetted starch and other minor ingredients. A "low shear force dough agglomerate" is one that has been subjected to a minimal amount of shear energy during the mixing process such that the flakes of the major ingredient remain intact. In addition, the "low shear force dough agglomerate" is held together by the adhesive force provided by the high water affinity starch. In contrast, a "high shear force dough" would comprise a cohesive, homogeneous, work hardened mass. Testing of low shear force dough agglomerates has been conducted using a 12" diameter×13" wide set of sheeting rolls from Thomas L. Green Bakery Equipment Company of Indianapolis, Ind. Sheeting low shear force dough agglomerates required 6.8 amps of electrical current to form a dough sheet at the rate of 26.6 feet per minute. When the same formulation was tested as a high shear force dough under the same conditions, the electrical current requirements to form a dough sheet at the rate of 27 fpm was 12.2 amps, or roughly 1.79 times more energy.

As shown in block 16 of FIG. 1, the method also includes the step of chopping the dough agglomerate into clumps of a desired sized. The chopping step can be performed using a conventional chopper, such as a Reitz Disintegrator manufactured by Bepex International LLC of Minneapolis, Minn.

As shown in block 18 of FIG. 1, the method also includes the step of sheeting the dough agglomerate into a dough sheet comprised of compressed agglomerates. The sheeting step can be performed using a conventional dough sheeter having one or more pairs of counter-rotating rollers configured to form the dough matrix with a desired thickness.

As shown in block 20 of FIG. 1, the method also includes the step of forming the dough sheet into snack pieces. The forming step can be performed using a conventional cutter configured to cut the dough sheet into snack pieces of a desired size and shape. Alternately, rather than by cutting, the dough pieces can be formed using a stamping apparatus, or an extrusion apparatus.

As shown in block 21 of FIG. 1, the method also includes the step of cooking the snack pieces. The cooking step can be performed by baking the snack pieces, by frying the snack pieces, or by microwaving the snack pieces. During the cooking step, the low shear composition of the dough provides vents for venting moisture and gases such that expansion is controlled. As used herein, the term "low shear composition" means the dough agglomerate has been mixed with a minimal amount of shear energy, such that the flakes of the major ingredient remain substantially intact. These intact flakes provide vents for venting moisture.

Referring to FIGS. 2A-2C and 3A-3C, a low shear mixing apparatus 22 configured to perform the mixing step is illustrated. The low shear mixing apparatus 22 includes a drum 24 open at one or both ends, and configured for rotation about it's longitudinal axis, as indicated by rotational arrow 32. A representative rotational speed for the drum 24 can be from 10 to 60 rpm. The low shear mixing apparatus 22 also includes an inlet conduit 26, such as a pipe or tubular member, configured to inject the dry ingredients 34 into the drum 24. During rotation of the drum 24, the ingredients 34 are held by gravity, friction and centrifugal force on the inside surface 46 of the drum 24, but also tumble back and mix as indicated by mixing arrow 44. The low shear mixing apparatus 22 also includes a scraper bar 28 that scrapes the ingredients 34 from the inside surface 46 of the drum 24, such that the bulk of the ingredients 34 are contained in an arc bounded by the scraper bar 28 and the lower portion of the drum 24. The low shear mixing apparatus 22 also includes a spray nozzle 30 in fluid communication with a water source. The spray nozzle 30 is configured to spray water 36 onto the ingredients 34 as they mix.

Figure 3A:
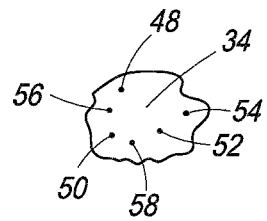
FIG. 3A is an enlarged schematic cross sectional view taken along section line 3A-3A of FIG. 2A showing the dough at the beginning of the mixing step as a mixture of dry ingredients.

As shown in FIG. 3A, the ingredients 34 are initially in powder form, and have a particle size of about 0.075 mm to 2.00 mm. The ingredients 34 can include potato flakes 48 as a major ingredient, and minor ingredients including emulsifier 50, sugar 52, salt 54, leavening 56, and the previously described modified starch 58 having a high affinity for water. A representative volume percentage by weight of these ingredients 34 can be as follows.

Potato flakes 48—50% to 90%.
Emulsifier 50—0% to 2%.
Sugar 52—0% to 10%.
Salt 54—0% to 2%.
Leavening 56—0% to 2%.
Starch—5% to 25%.

Figure 2B:
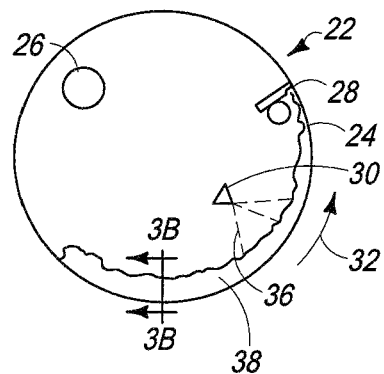
FIG. 2B is a schematic cross sectional view of the low shear force mixing apparatus at the middle of the mixing step.
Figure 3B:
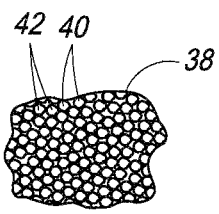
FIG. 3B is an enlarged schematic cross sectional view taken along section line 3B-3B of FIG. 2B showing the dough at the middle of the mixing step as a dough agglomerate comprised of small clumps.

As shown in FIGS. 2B and 3B, as water 36 is added to the ingredients 34, a dough agglomerate 38 begins to form. As shown in FIG. 3B, the dough agglomerate 38 includes areas of wetted potato flakes 40 surrounded by and attached to wetted starch and other minor ingredients 42. Initially, the areas of wetted potato flakes 40 are relatively small in size but get bigger as the mixing process continues. A representative initial size of the areas of wetted potato flakes 40 after from about 15 seconds to 60 seconds of mixing can be from 2 mm to 5 mm. The dough agglomerate 38 also includes air pockets interspersed with the areas of wetted potato flakes 40 and the wetted starch and other minor ingredients 42.

Figure 2C:
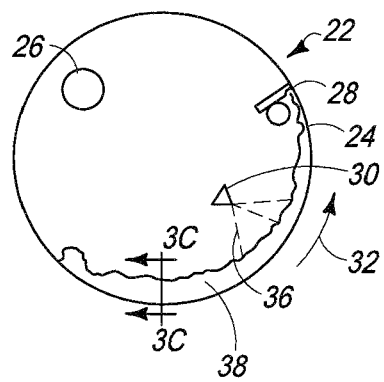
FIG. 2C is a schematic cross sectional view of the low shear force mixing apparatus at the end of the mixing step.
Figure 3C:
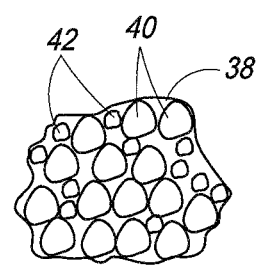
FIG. 3C is an enlarged schematic cross sectional view taken along section line 3C-3C of FIG. 2C showing the dough agglomerate at the end of the mixing step comprised of large clumps.
Figure 4:
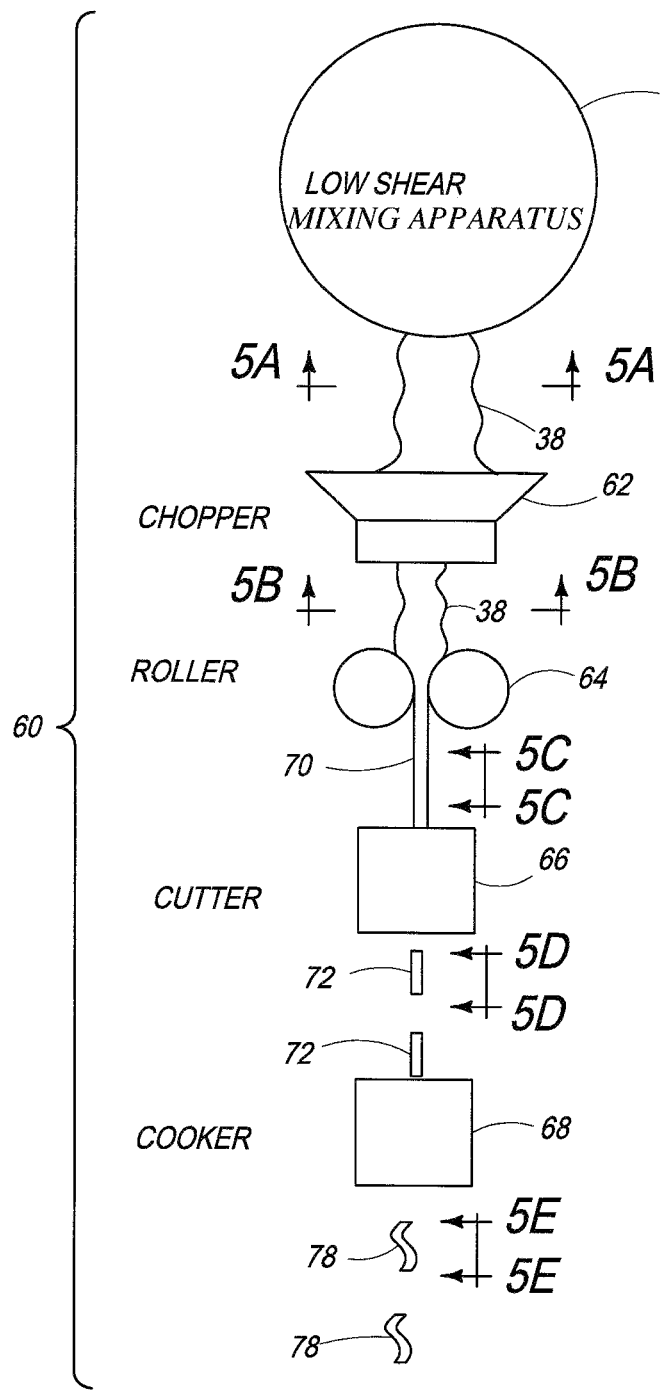
FIG. 4 is a schematic drawing of a system for performing the method of FIG. 1.

As shown in FIGS. 2C and 3C, as the mixing step continues, areas of wetted potato flakes 40 in the dough agglomerate 38 gradually becomes bigger with a representative final size of 2 mm to 22 mm in diameter after about 30 seconds to 120 seconds of mixing.

Figure 5A:
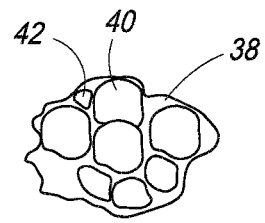
FIG. 5A is an enlarged schematic cross sectional view taken along section line 5A-5A of FIG. 4 showing the dough agglomerate at the end of the mixing step comprised of large clumps.
Figure 5B:
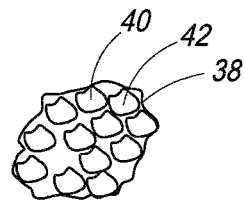
FIG. 5B is an enlarged schematic cross sectional view taken along section line 5B-5B of FIG. 4 showing the dough agglomerate at the end of the chopping step comprised of uniform sized clumps.

Referring to FIGS. 4 and 5A-5E, a system 60 for performing the method of FIG. 1 is illustrated. The system 60 includes the low shear mixing apparatus 22 configured to mix the ingredients 34 (FIG. 2A) into the dough agglomerate 38 (FIG. 5A) comprised of the areas of wetted potato flakes 40 (FIG. 5A) and the wetted starch and other minor ingredients 42 (FIG. 5A).

The system 60 also includes a chopper apparatus 62 configured to chop the dough agglomerate 38 such that the areas of wetted potato flakes 40 (FIG. 5B) and the wetted starch and other minor ingredients 42 (FIG. 5B) are substantially uniform in size. A representative final size of the areas of wetted potato flakes 40 (FIG. 5B) following the chopping step can be from 3 mm to 10 mm in diameter. The chopping apparatus can comprise a conventional commercial chopper such as a Reitz Disintegrator Model RA1-4-K311 having rotating knives configured to break up the dough agglomerate 38.

Figure 5C:
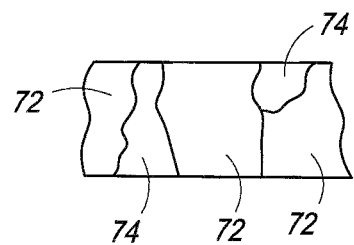
FIG. 5C is an enlarged schematic side view taken along line 5C-5C of FIG. 4 showing a dough sheet comprised of compressed agglomerates.

The system 60 also includes a dough roller apparatus 64 configured to roll the dough agglomerate 38 into a dough sheet 70. The dough roller apparatus 64 can comprise a conventional dough roller, such as one manufactured by Reading Bakery Systems of Robesonia, Pa. The dough roller apparatus 64 can be configured to roll the dough sheet 70 to a thickness of about 0.50 mm to 1.50 mm. As shown in FIG. 5C, the dough sheet 70 includes compressed agglomerates of wetted potato flake 72 combined with wetted starch and other minor ingredients 74.

Figure 5D:
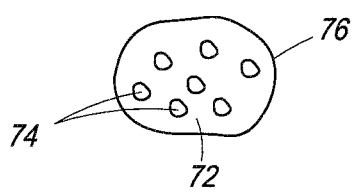
FIG. 5D is an enlarged schematic side view taken along line 5D-5D of FIG. 4 showing a cut snack piece comprised of compressed agglomerates.
Figure 5E:
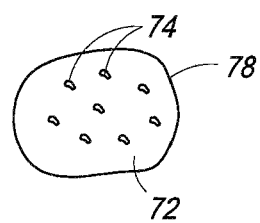
FIG. 5E is an enlarged schematic side view taken along line 5E-5E of FIG. 4 showing a cooked snack product.

The system 60 also includes a cutter apparatus 66 configured to cut the dough sheet 70 into uncooked snack pieces 76. As shown in FIG. 5D, each snack piece 76 includes compressed agglomerates of wetted potato flake 72 combined with wetted starch and other minor ingredients 74 as previously described.

The system 60 also includes a cooker apparatus 68 configured to cook the snack pieces 72 into the snack product 78. The cooker apparatus 68 can comprise an oven configured to bake the snack pieces 72 at a temperature of from 100° C. to 420° C. for a time period of from 60 seconds to 240 seconds. Ovens suitable for this purpose are available from Reading Bakery Systems of Robesonia, Pa., as well as others. Alternately, the cooker apparatus 68 can comprise a frying system. Suitable cooking systems are available from Reading Bakery Systems of Robesonia, Pa., as well as others. During the cooking step the compressed agglomerates of wetted potato flakes 72 include intact flakes which provide a conduit for moisture and gasses to escape. The compressed agglomerates of wetted potato flakes 72 also control the expansion of the snack product 78 and prevent excessive bubbling in the snack product 78. The cooked snack product 78 includes a matrix of cooked compressed agglomerates of wetted potato flakes 72 surrounded by cooked wetted starch and other minor ingredients 74.

Thus the disclosure provides a method and a system for making snack products, and a snack product fabricated using the process and system. Although the method and the system have been described with reference to certain preferred embodiments, as will be apparent to those skilled in the art, certain changes and modifications can be made without departing from the scope of the invention, as defined by the following claims.

What is claimed is:

1. A method for making a snack product comprising:
   mixing potato, corn or grain flakes with water and a high water affinity starch using a mixing apparatus configured to tumble, mix and spray water on the flakes and the starch while the flakes remain intact;
   controlling the mixing step and selecting a quantity of water to form a dough agglomerate comprised of areas of wetted flakes surrounded and held together by wetted starch;
   controlling the mixing step such that the areas of wetted flakes surrounded and held together by wetted starch increase in size as the mixing step continues;
   following the mixing step, chopping the dough agglomerate into clumps of dough agglomerate such that the areas of wetted flakes surrounded and held together by wetted starch have a uniform size;
   compressing the clumps of dough agglomerate using sheeting rolls into a dough sheet comprised of compressed agglomerates;
   forming the dough sheet into snack pieces; and
   cooking the snack pieces.

2. The method of claim 1 wherein the size of the areas of wetted flakes surrounded and held together by wetted starch during the mixing step is from 2 mm to 22 mm in diameter.

3. The method of claim 1 wherein prior to the mixing step the flakes have a particle size of from 0.075 mm to 2.00 mm.

4. The method of claim 1 further comprising during the mixing step mixing at least one additional ingredient selected from the group consisting of emulsifier, sugar, salt and leavening.

5. The method of claim 1 wherein the mixing step is performed for from 30 to 120 seconds at a rotational speed of the drum of from 10 to 60 rpm.

6. A method for making a snack product comprising:
   mixing potato flakes with selected ingredients including a starch having an affinity for water with a quantity of water using a mixing apparatus comprising a rotating drum configured to tumble and mix the potato flakes and the ingredients along an inside surface thereof while the potato flakes remain intact and a nozzle configured to spray water on the potato flakes and the ingredients;
   controlling the mixing step and selecting the quantity of water to form a dough agglomerate comprised of areas of wetted potato flakes surrounded and held together by wetted starch;
   controlling the mixing step such that the areas of wetted potato flakes increase in size as the mixing step proceeds and with the size of the areas of wetted potato flakes being from 2 mm to 22 mm in diameter;
   chopping the dough agglomerate into clumps of dough agglomerate with the areas of wetted potato flakes having a uniform size;
   compressing the clumps of dough agglomerate using sheeting rolls into a dough sheet comprising compressed agglomerates;
   forming the dough sheet into snack pieces; and
   cooking the snack pieces.

7. The method of claim 6 wherein the mixing step is performed for from 30 to 120 seconds at a rotational speed of the drum of from 10 to 60 rpm.

8. The method of claim 6 wherein prior to the mixing step the potato flakes have a particle size of from 0.075 mm to 2.00 mm.

9. The method of claim 6 wherein the forming step is performed using a cutter apparatus configured to cut the dough sheet into the snack pieces.

10. The method of claim 6 wherein the rolling step is performed using a 12" diameter×13" wide set of sheeting rolls powered by 6.8 amps of electrical current at a rate of 26.6 feet per minute.

11. The method of claim 6 wherein the selected ingredients include emulsifier, sugar, salt, and leavening.

12. The method of claim 6 wherein a percentage by weight of the potato flakes following the mixing step is about 50% to 90%, and a percentage by weight of the starch following the mixing step is about 5% to 25%.

13. The method of claim 6 wherein after from about 15 seconds to 60 seconds of mixing, the areas of wetted potato flakes have a diameter of from 2 mm to 5 mm.

14. The method of claim 6 wherein after about 30 seconds to 120 seconds of mixing, the areas of wetted potato flakes have a diameter of from 2 mm to 22 mm.

15. A system for making a snack product comprising:
   a plurality of potato, corn or grain flakes;
   a plurality of selected ingredients including a starch having a high affinity for water, the selected ingredients including at least one additional ingredient selected from the group consisting of emulsifier, sugar, salt and leavening;

a mixing apparatus configured to mix the flakes and water into a dough agglomerate comprised of areas of wetted flakes surrounded and held together by wetted starch;

the mixing apparatus comprising a rotating drum configured to tumble the flakes and the selected ingredients along an inside surface thereof, a scraper bar configured to scrape the inside surface of the drum and to contain the flakes and the selected ingredients in a selected area of the drum, and a nozzle configured to spray water onto the flakes and the selected ingredients;

a chopper apparatus configured to chop the dough agglomerate into clumps of dough agglomerate with the areas of wetted potato flakes uniform in size; and a dough roller apparatus configured to sheet the clumps of dough agglomerate into a dough sheet comprised of compressed agglomerates.

16. The system of claim 15 wherein the roller apparatus includes a set of rollers 12" in diameter and 13" wide.

17. The system of claim 15 wherein the roller apparatus is configured to roll the dough sheet with a thickness of from 0.50 mm to 1.50 mm.

18. The system of claim 15 further comprising a cutter apparatus configured to cut the dough sheet into snack pieces.

19. The system of claim 15 further comprising a cooker configured to cook the snack pieces.

20. The system of claim 15 wherein the flakes comprise potato flakes having a percentage by weight of about 50% to 90%, and wherein a percentage by weight of the starch is about 5% to 25%.

* * * * *